(12) United States Patent
Gupta et al.

(10) Patent No.: US 11,017,604 B2
(45) Date of Patent: May 25, 2021

(54) AUGMENTED REALITY EMPLOYEE RECOGNITION

(71) Applicant: Dell Products L.P., Round Rock, TX (US)

(72) Inventors: Shubham Gupta, Jaipur (IN); Rohan Sharma, Delhi (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/589,438

(22) Filed: Oct. 1, 2019

(65) Prior Publication Data

US 2021/0097764 A1    Apr. 1, 2021

(51) Int. Cl.
  *G06T 19/00* (2011.01)
  *H04N 1/00* (2006.01)
  *H04L 29/02* (2006.01)
  *G06F 3/01* (2006.01)
  *G06T 11/60* (2006.01)

(52) U.S. Cl.
  CPC ............ *G06T 19/006* (2013.01); *G06F 3/011* (2013.01); *G06T 11/60* (2013.01); *H04L 29/02* (2013.01); *H04N 1/00127* (2013.01)

(58) Field of Classification Search
  CPC ........ G06T 19/006; G06T 11/60; G06F 3/011; H04L 29/02; H04N 1/00127
  See application file for complete search history.

(56) References Cited

U.S. PATENT DOCUMENTS

| 2013/0279757 | A1* | 10/2013 | Kephart | G06K 9/00771 382/105 |
| 2013/0335509 | A1* | 12/2013 | Cafferata | G06Q 30/02 348/14.08 |
| 2015/0269421 | A1* | 9/2015 | Liu | G06K 9/629 382/118 |
| 2018/0341323 | A1 | 11/2018 | Mate et al. | |

* cited by examiner

*Primary Examiner* — Haixia Du
(74) *Attorney, Agent, or Firm* — Daly, Crowley Mofford & Durkee, LLP (57) ABSTRACT

A system and method provide an interactive augmented reality experience customized for providing instant employee recognition in the workplace. A client electronic device streams camera image data to an instant recognition system. When the image includes a face, the system automatically identifies the imaged individual. The system then aggregates information about the individual from a variety of sources for transmission to the client electronic device for simultaneous display with the camera image. The system also may automatically generate a video of a person speaking about the individual using a generative adversarial network for streaming to the device in response to user activity. The system further may allow a user of the client electronic device to personalize the augmented reality experience by modifying or annotating the individual's face or body with amusing images using an interactive canvas.

17 Claims, 9 Drawing Sheets

AUGMENTED REALITY EMPLOYEE RECOGNITION

FIELD

The disclosure pertains generally to image data processing and generation, and more particularly to mixed or augmented reality by combining 2D text and 3D video with 3D real-world image data.

BACKGROUND

Augmented reality, or "AR", is a technology that superimposes a computer-generated image on a user's perception of the real world to provide a composite. Users wishing to have an AR experience augment their natural senses using computer-generated perceptual information, for example in a handheld electronic device such as a smartphone or a wireless-enabled camera, or in a wearable such as the Glass™ wearable computing device from Google LLC of Mountain View, Calif. To provide an augmented visual sense, a camera feeds images or video of the world around the user to an AR processor, which may be inside the device or may be in a separate computer, and the AR processor sends back still or moving images that are superimposed on the camera display, thereby augmenting it.

SUMMARY OF DISCLOSED EMBODIMENTS

Disclosed embodiments provide systems and methods for an interactive augmented reality experience customized for providing instant employee recognition in a workplace. Embodiments work with any AR-enabled device, especially smart glasses which are relatively inobtrusive in the natural social settings that occur in the workplace. Unlike peer-to-peer AR systems, disclosed embodiments permit the employee, managers, or coworkers to update achievement information (for example company awards, patents, and hours-worked milestones) across a wide variety of information systems, and these data are aggregated in a single app to simultaneously and naturally show many different facets of an employee's contributions. Each type of achievement may be rewarded with a badge that displays next to the employee in the AR environment. The employee may use an interactive achievement canvas to personalize the display with other information, such as a hobby or other conversation starter, or decorate his or her own face with a variety of amusing images to be shown to others. Video of a company leader praising the employee can be simulated in real-time and displayed in the AR environment.

Traditional methods of recognizing employees, such as company-wide dashboards and teleconferences, may describe the achievements of individual employees, the spread of this information is limited to participants, and to the context in which these methods occur. This information is not readily available in natural social settings among non-participants, such as when coworkers talk face-to-face, where it would be particularly valuable. But in accordance with various embodiments that provide immediate perceptual information to their colleagues, employees will feel more motivated, valued, and more visibly recognized. Coworkers will have access to topics that they can bond over, even if they have never before met, enabling instant recognition of a "smart journey" each peer has taken within the company. And company leaders always will have the most current information about the contributions and achievements made by their team members—even if those contributions were made outside the normal team interaction.

Thus, a first embodiment is a system for providing an interactive augmented reality experience using an electronic device having a camera and a display. The system includes a data communication gateway configured to receive data, from the camera, that encodes an image being shown on the display, the image including an individual's face. The system also includes a face recognizer in data communication with the gateway and configured to automatically identify the individual using the data received by the gateway. The system further includes a data aggregator in data communication with the face recognizer and configured to retrieve, from one or more information sources, textual, graphical, audible, or audiovisual information pertaining to the identified individual. The system additionally includes a video creator in data communication with the face recognizer and configured to automatically generate a video of a person speaking about the identified individual. The data communication gateway is configured to transmit the textual, graphical, audible, or audiovisual information, or the video, or any combination thereof toward the electronic device for presentation on the display overlying the image being shown on the display.

Some embodiments further include a database coupled to the face recognizer, wherein the face recognizer is configured to automatically identify the individual from within a plurality of individuals, using facial features extracted from each of the plurality of individuals and stored in the database.

Some embodiments further include a database coupled to the data aggregator, wherein the data aggregator is configured to regularly retrieve, and store in the database, textual, graphical, audible, or audiovisual information pertaining to each of a plurality of individuals, the plurality of individuals including the identified individual.

Some embodiments further include a database coupled to the video creator, wherein the video creator is configured to automatically generate the video of the person speaking about the identified individual by training a generative adversarial network on stock footage of the person that is stored in the database.

A second embodiment is a method of providing an interactive augmented reality experience using an electronic device having a camera and a display. The method includes receiving data, in a computer system from the camera, that encodes an image being shown on the display, the image including an individual's face. The method next includes automatically identifying the individual using the received data. The method then includes retrieving, from one or more information sources, textual, graphical, audible, or audiovisual information pertaining to the identified individual. The method continues with automatically generating a video of a person speaking about the identified individual. The method concludes with transmitting the textual, graphical, audible, or audiovisual information, or the video, or any combination thereof by the computer system toward the electronic device for presentation on the display overlying the image being shown on the display.

In some embodiments, the electronic device comprises a camera having wireless data communication, or a smartphone, or augmented reality glasses.

In some embodiments, the image being shown on the display comprises a video.

In some embodiments, automatically identifying the individual using the received data comprises using facial features extracted from each of the plurality of individuals and stored in a database.

In some embodiments, retrieving the textual, graphical, audible, or audiovisual information comprises regularly retrieving, and storing in a database, textual, graphical, audible, or audiovisual information pertaining to each of a plurality of individuals, the plurality of individuals including the identified individual.

In some embodiments, retrieving the textual, graphical, audible, or audiovisual information comprises retrieving information that was associated to the identified individual by a person using an image editing application.

In some embodiments, automatically generating the video of the person speaking about the identified individual comprises training a generative adversarial network on stock footage of the person that is stored in a database.

In some embodiments, transmitting comprises transmitting in response to receiving data, from the electronic device, indicating that a user of the electronic device has selected a control in a graphical user interface overlying the image shown on the display.

A third embodiment is a tangible, computer-readable storage medium, in which is non-transitorily stored computer program code for performing the above-described method, or any of its various embodiments.

DESCRIPTION OF THE SEVERAL VIEWS OF THE DRAWINGS

The manner and process of making and using the disclosed embodiments may be appreciated by reference to the drawings, in which.

DETAILED DESCRIPTION

Figure 1:
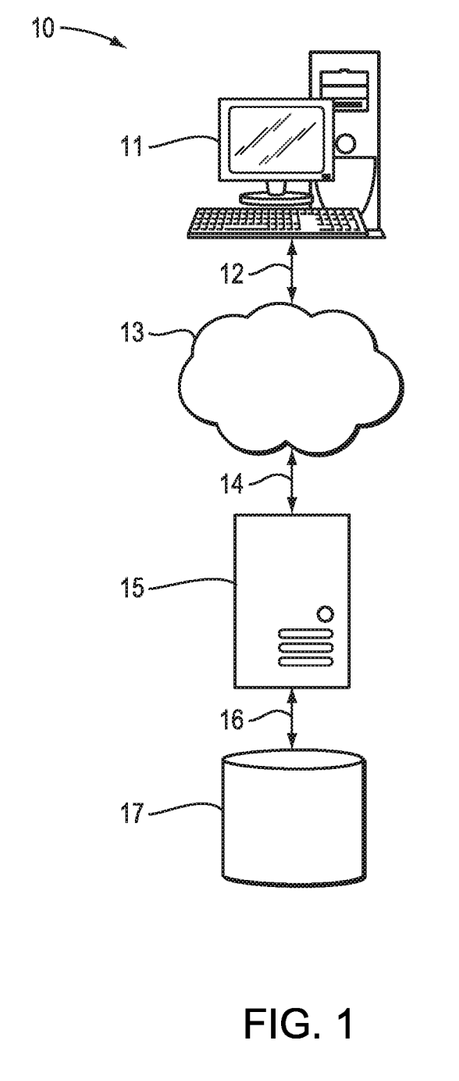
FIG. 1 schematically shows a typical client-server system in which the disclosed concepts, structures, and techniques may be advantageously embodied.

FIG. 1 schematically shows a typical client-server system 10 in which the disclosed concepts, structures, and techniques may be advantageously embodied. In accordance with client-server principles, the system 10 includes at least one client device coupled for bidirectional data communication with at least one server device using a data network. Generally, the client requests, via the data network, that the server perform a computation or other function, and the server responsively fulfills the request, optionally returning a result or status indicator to the client via the data network.

Thus, the system 10 includes a client device 11. The client device 11 is illustrated as a desktop computer, but may be any electronic device known in the art, including without limitation a laptop computer, tablet computer, smartphone, embedded system, or any other device capable of transmitting and receiving data, and requesting that another electronic device perform a computation.

The client device 11 is coupled, via a data link 12, to a data network 13. The data link 12 is any combination of hardware or software suited for communicating data between the client device 11 and other electronic devices via the data network 13. The data link 12 may be, for example, a wired Ethernet link based on the Institute of Electrical and Electronics Engineers ("IEEE") 802.3 family of standards, a wireless radio link based on the IEEE 802.11 family of standards ("Wi-Fi"), or any other data connection.

The data network 13 is any combination of hardware or software suited for communicating data between electronic devices via data links. The data network 13 may be, for example, a local area network ("LAN"), a wide area network ("WAN"), a metropolitan area network ("MAN"), a virtual private network ("VPN"), the Internet, or any other type of data network.

It is appreciated that a data network 13 operates to mediate data communication between multiple electronic devices. Thus, the depiction of only a single client device 11 in FIG. 1 is merely illustrative, and a typical system 10 may have any number of client devices coupled for data communication using corresponding data links to the data network 13. It is also appreciated that the data network 13 may be operated by any number of autonomous entities, and thus may be a conglomeration of smaller networks that exchange data according to standardized protocols and data formats, including without limitation the Internet Protocol ("IP") specified by Internet Standard STD 5, the User Datagram Protocol ("UDP") specified by Internet Standard STD 6, and the Transmission Control Protocol ("TCP") specified by Internet Standard STD 7, among others.

The data network 13 allows the client device 11 to communicate with a server device 15, which is coupled to the data network 13 using a data link 14. The data link 14 is any combination of hardware or software suited for communicating data between the server device 15 and other electronic devices via the data network 13. The server device 15 may be any electronic device known in the art that is capable of transmitting and receiving data, and performing a computation on behalf of another electronic device.

Again, the data network 13 operates to mediate data communication between multiple electronic devices. Thus, the depiction of only a single server device 15 in FIG. 1 is merely illustrative, and a typical system 10 may have any number of server devices coupled for data communication using corresponding data links to the data network 13. In particular, to provide simultaneous service to large numbers of client devices, a particular computation (or type of computation, such as rendering a web page) may be allocated to one of multiple server devices using a load balancer or other device. It is further appreciated that the server device 15, along with additional server devices if required, may provide well-defined operations known as "services" according to a service-oriented architecture ("SOA"), as those terms are known in the art.

It is appreciated in accordance with client-server principles that the designation of device 11 as the "client device" and device 15 as the "server device" is arbitrary, as most electronic devices that are capable of transmitting and receiving data can perform computations on behalf of other electronic devices upon receipt of data, so requesting, according to a mutually agreed protocol. Thus, the designation of "client device" and "server device" is made herein with regard to an intended mode of operation of the system 10, namely that the client device 11 is the device requesting that a particular computation be performed on behalf of a user thereof, and that the server device 15 operates a "service" to perform the computation and communicate the results to the client device 11. A typical protocol for such interaction is the Hypertext Transfer Protocol ("HTTP" or "HTTP/1.1") specified as a proposed Internet Standard by Requests for Comment ("RFC") 7230 through 7235, which is used to implement the World Wide Web.

FIG. 1 shows the server device 15 coupled, via a storage link 16, to a data storage device 17. The data storage device 17 may be a database, file system, volatile or non-volatile memory, network attached storage ("NAS"), storage area network ("SAN"), or any other hardware or software that is capable of storing data used by a server device 15 or a service executing thereon. The storage link 16 may be any hardware or software capable of communicating data between the server device 15 and the data storage device 17. It is appreciated that, where more than one server device 15 is present, multiple server devices may communicate with the same data storage device 17 to provide data sharing between the server devices.

It is appreciated that a requested computation may be done in several parts, thereby requiring the system 10 to retain an intermediate computational state between requests. If the services provided by the server device 15 do not store any such state (for example, to simplify their design), then the client device 11 must supply all state with each request. This type of communication may be provided using the representational state transfer ("REST") client-server architecture. In addition to being a stateless client-server architecture, REST systems permit responses to requests with identical inputs to be cached to improve response time; permit layering of services, thereby multiplying available functionality; permit services to require clients to perform some computation locally to improve performance; and provide a uniform interface for all client devices.

Figure 2:
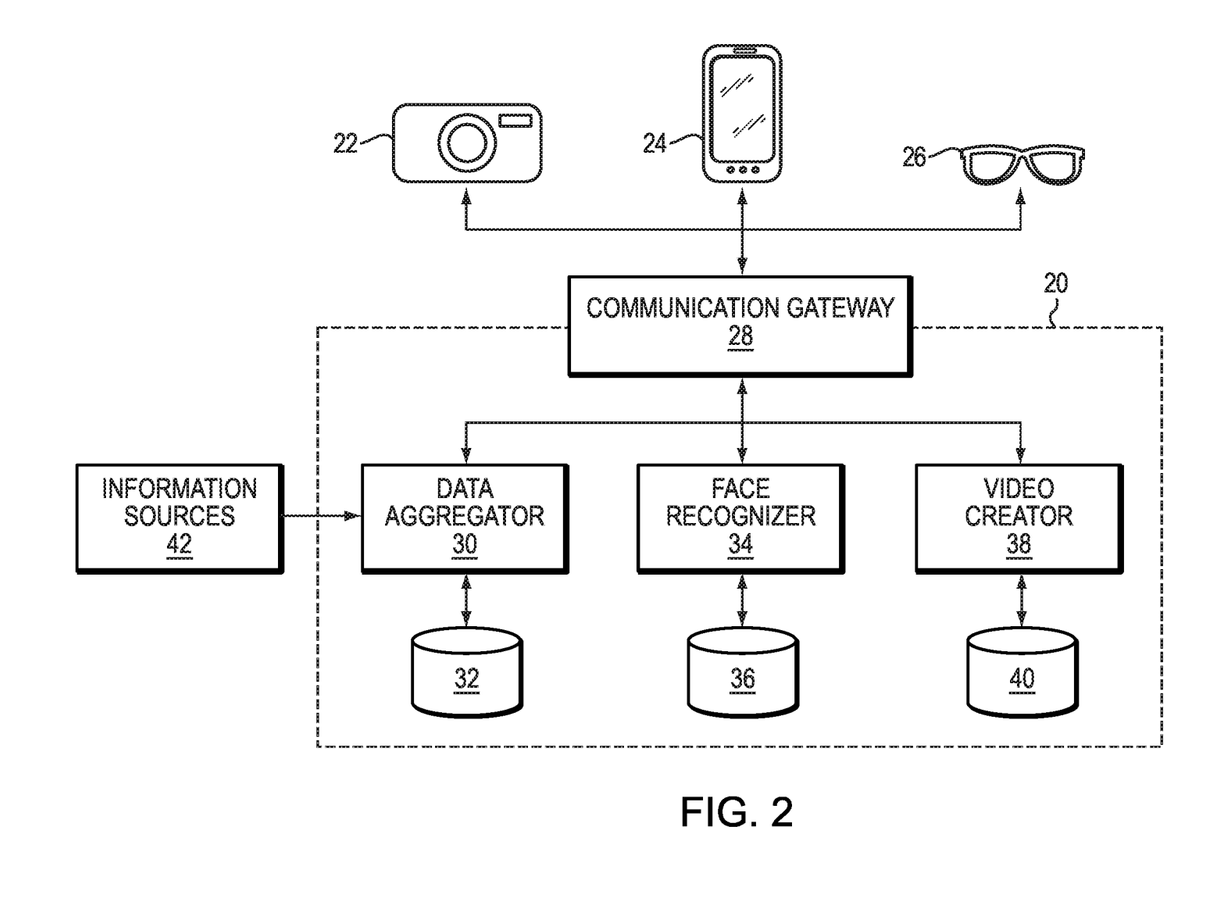
FIG. 2 schematically shows relevant components of a system embodiment.

FIG. 2 schematically shows relevant components of system 20 for providing an interactive augmented reality (AR) experience, for example according to the display described below beginning with FIG. 4. In embodiments, the system 20 provides, to client devices, AR services described herein as "instant recognition" and "achievement canvas", and may provide other AR services. In FIG. 2 are shown various client devices, which may be the client device 11 of FIG. 1, such as a camera 22 having wireless data communication, a smartphone 24, and AR glasses 26. Likewise, the system 20 may be implemented on one or more server devices 15 in hardware or a combination of hardware and software, and includes a communication gateway 28, a data aggregator 30, an aggregator database 32, a face recognizer 34, a feature database 36, a video creator 38, and a video database 40.

The communication gateway 28 is the main intermediary for passing data between the client devices 22, 24, 26 and the remaining functional components of the system 20. The communication gateway 28 is configured to receive data from the camera of any of the client devices 22, 24, 26. Typically, this will be accomplished through the use of an application or "app" executing on the client device. Upon launch, the app and the communication gateway 28 establish a data session, and further data exchange between the client device and the communication gateway 28 occurs in the context of that session.

In normal use, the app streams camera data, which is typically a moving image or video that is simultaneously being shown on a display of the client device, to the communication gateway (e.g. using the data network 13). In illustrative embodiments, the moving image will, at various times, include a portion of a person, especially the individual's face. In embodiments, including those providing an interactive achievement canvas as described below in connection with FIGS. 6A to 6D, an individual also may use a client device 22, 24, 26 to transmit a still image of the individual's own face to the communication gateway 28 to edit the image or provide information pertaining to the individual for display to others.

The data aggregator 30 serves to aggregate data from information sources 42 that pertain to individuals recognized by the system 20. These information sources 42 may be third-party software having an application programming interface ("API") for allowing the data aggregator 30 to retrieve data. The information sources 42 may provide textual, graphical, audible, or audiovisual information relevant, for example, to employee charitable activities, volunteering, non-profit work, human resources, financial performance, hours worked, notable achievements, social media, inventiveness, or other areas of personal or professional life. In some cases, an individual may provide this information herself, while in other cases this information may be automatically created by others using third-party software. While FIG. 2 shows the information sources 42 as being external to the system 20, it is appreciated that in various embodiments, some or all of the information sources may be included within the system 20.

In some embodiments, the data aggregator 30 operates to aggregate information from the information sources 42 in response to receiving a request from the communication gateway 38. However, preferably the data aggregator 30 operates on a regular basis to obtain or "scrape" this information from the information sources 42, and stores the obtained information in an aggregation database 32, which may be any database known in the art for storing and retrieving data.

The face recognizer 34 serves to recognize faces in images whose data was streamed to the communication gateway 28 from a client device. The face recognizer 34 can be implemented using techniques known in the art of face recognition. For this purpose, the face recognizer 34 may use a feature database 36 that stores, for each relevant individual, facial features that the face recognizer 34 or other facial recognition device or software has previously extracted. In this connection, prior to the system 20 performing the augmented reality experience using the client devices 22, 24, 26, relevant individuals may upload still images to the face recognizer 34 (via the communication gateway 28 or via another route) to extract the features and/or train the face recognizer 34. Once uploaded, these still images may be edited using the interactive achievement canvas described below, and the edited images stored in the feature database 36 or another location.

The video creator 38 automatically generates videos pertaining to a relevant individual. The video creator 38 can be implemented using techniques known in the art of automatic video creation, but especially the use of a generative adversarial network ("GAN"). A GAN is a machine learning system in which two neural networks learn by playing an adversarial game against each other. The first neural network is "generative" in that it generates candidate outputs, while the second neural network is "discriminative" in that it attempts to distinguish generated outputs from "correct"

underlying data patterns. The generative network's training (e.g. as a deconvolutional network) is reinforced when it "fools" the discriminative network, while the discriminative network's training (e.g. as a convolutional network) is reinforced when it is not fooled.

In connection with disclosed embodiments, the video creator 38 may use a GAN to create synthetic videos of a person, such as a company leader or other notable person, speaking about the relevant individual. The use of a GAN to create such videos is advantageous, especially in a very large company, because it reduces the amount of actual videos that the leader must create personally. That is, one may first use stock footage of the leader (e.g. as stored in a video database 40) speaking according to various scripts or snippets of conversation as the initial training data for the discriminative network of the video creator 38. Preferably, the footage shows the leader against a solid color background that can be converted to a transparent background for display during an AR experience. Next, the generative network is trained to output videos of the leader speaking according to scripts or snippets of conversation in different orders. Training is complete when the video creator 38 outputs videos according to random scripts with sufficient accuracy to convince a viewer that they were spoken by the leader personally.

Once the GAN has been trained sufficiently well, the video creator 38 may be used to output a video that is customized for the relevant individual according to a personalized script. The script itself may be stored in the video database 40, for example, and configured by a manager or other person in the company. In some embodiments, the video creator 38 automatically generates the customized video as soon as the script has been finalized, and stores the video in the video database 40 for later viewing. In other embodiments, the video creator 38 automatically generates the customized video in real-time, in response to a request to do so by a client device 22, 24, 26 during an AR experience.

It should be understood that FIG. 2 shows three databases 32, 36, 40 only for the purpose of simplifying and clarifying the present disclosure. In various embodiments, these databases need not be implemented separately, and any or all of them may be implemented in one or more server devices 15, data storage devices 17, or combination thereof. As also may be understood from FIG. 2, the communication gateway 28, the data aggregator 30, the face recognizer 34, and the video creator 38 communicate data with each other, while only the communication gateway 28 communicates with the client devices 22, 24, 26.

Figure 3:
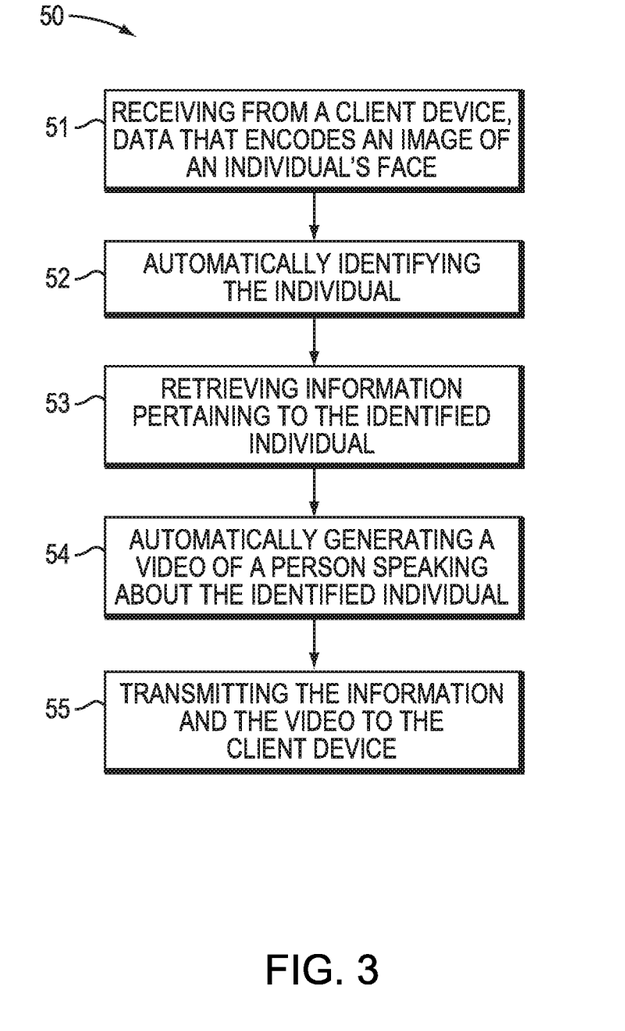
FIG. 3 is a flowchart of a method of providing an interactive augmented reality experience using an electronic device having a camera and a display according to an embodiment.

FIG. 3 is a flowchart of a method 50 of providing an interactive augmented reality (AR) experience, for example according to the display described below in connection with FIGS. 4 and 5A to 5D. The method 50 may be used in the client-server architecture of FIG. 1, and in particular may be performed for one or more server devices 15 to provide an AR experience using an electronic device having a camera and a display, such as client device 11. In particular, the method 30 may be performed as a service by the system 20 at the request of an app executing on one or more of the client devices 22, 24, 26 of FIG. 2, or in another computer system. It is appreciated that the computer system implementing the method 50 has hardware, or a combination of hardware and software, but is specially configured to perform the processes now described.

The method 50 begins with a process 51 of receiving data, in a computer system from a camera of the client device, that encodes an image being shown on the display, the image including an individual's face. For example, the client device may stream image data to the computer system. For this purpose, the computer system may include a system for mediating data communications between the client device and the other functional components of the computer system, such as communication gateway 28. The streamed camera data may be received by the computer system concurrently with other streams of camera data from other client devices, and the computer system may establish data communication sessions with each client device to facilitate this process 51.

Next, the method 50 performs a process 52 of automatically identifying the individual using the received data. For this purpose, the computer system may include a facial recognition system such as face recognizer 34 and feature database 36. The process 52 may operate on the received data to (a) identify the outline of a face in the encoded image, (b) extract facial features from inside the outline, and (c) compare those facial features against stored features in a feature database.

Then the method 50 performs a process 53 of retrieving, from one or more information sources, textual, graphical, audible, or audiovisual information pertaining to the identified individual. For this purpose, the computer system may include a data aggregation and storage system such as data aggregator 30 and aggregation database 32. The process 53 may operate to contact a collection of information sources using a data communication network, such as the Internet or a private network, using an information retrieval protocol in response to completion of the process 52 (i.e., once the individual has been identified). Alternately, the process 53 may operate to retrieve the information, previously obtained from the information sources, from a database. In this embodiment, the database acts as a cache for the information.

The method 50 also performs a process 54 of automatically generating a video of a person speaking about the identified individual. For this purpose, the computer system may include a video creation component, such as video creator 38 and video database 40. The process 54 may operate to generate the video by applying a script to a generative adversarial network (GAN) that was trained on stock footage of the person speaking that is stored in a database, or by another technique known in the art.

The method 50 finally performs a process 55 of transmitting the textual, graphical, audible, or audiovisual information, or the video, or any combination thereof by the computer system toward the electronic device for presentation on the display overlying the image being shown on the display. For this purpose, the computer system may utilize the system for mediating data communications between the client device and the other functional components of the computer system, such as communication gateway 28. The process 55 operates to provide the information and the video to the client device.

In some embodiments, the process 55 is triggered in response to the computer system receiving data, from the client device, indicating that a user of the electronic device has selected a control in a graphical user interface overlying the image shown on the display. This feature is described in greater detail below in connection with the AR experience illustrated beginning with FIG. 4. It is appreciated that, in accordance with embodiments, the data transmitted to the client device is presented on a display of the client device overlying the camera image being shown on the display. In this way, the camera image is augmented to provide an AR experience to a user of the client device.

Figure 4:
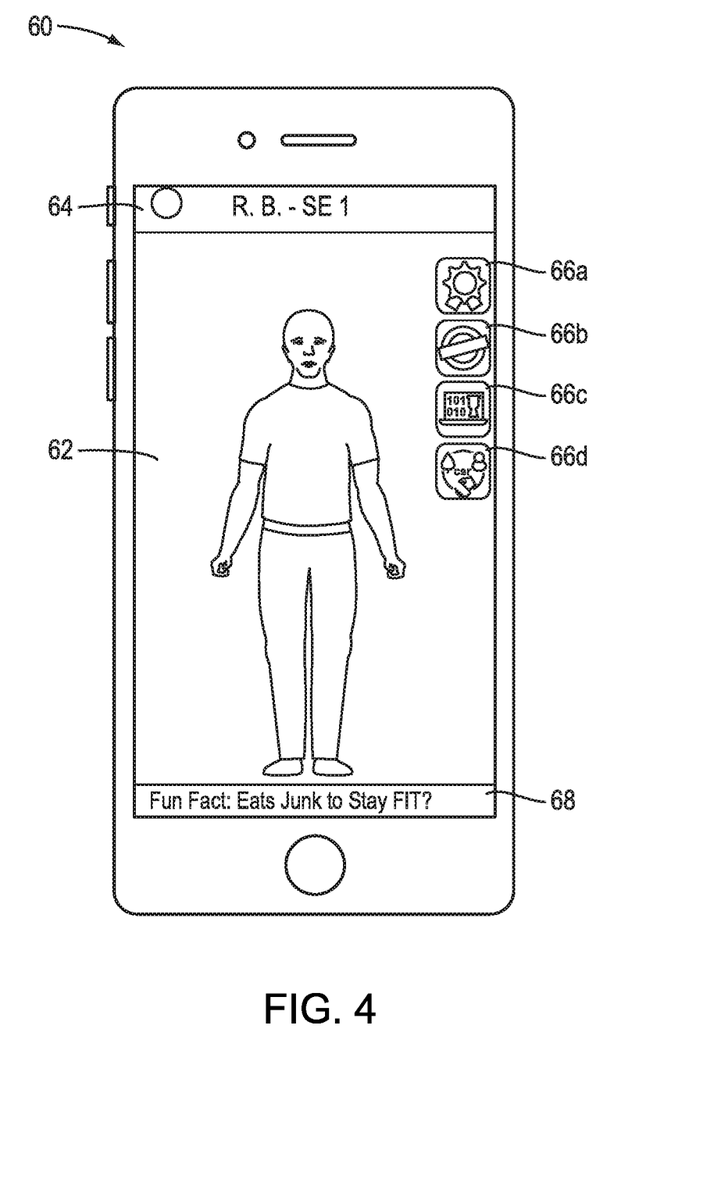
FIG. 4 graphically represents an illustrative arrangement of visual elements shown on a display in accordance with an instant recognition embodiment.

FIG. 4 graphically represents an illustrative arrangement of visual elements shown on a display 62 in accordance with an instant recognition embodiment. The display 62 shown in FIG. 4 is that of a smartphone 60, but it is appreciated that the display may appear on any client device (such as client device 11) having a camera. In particular, the display 62 may appear on a camera 22, a smartphone 24, AR glasses 26, or other electronic device. It should be understood that the display 62 shows visual elements according to the design and operation of an application or app executing on the client device. The app may be provided with the electronic device by its manufacturer, or may be downloaded and installed onto the electronic device after acquisition.

In accordance with embodiments of the concepts, structures, and techniques disclosed herein for recognizing an individual by an image of his face, the app shows a name bar 64 on the display 62 of FIG. 4. That is, the app has communicated with a system for instantly recognizing the individual in the field of view of the camera (such as the system 20 of FIG. 2), and that system has recognized the individual and communicated the name of the individual back to the app for presentation in the name bar 64 on the display 62. It is appreciated that data other than the individual's name may be displayed in the name bar 64, including for example a company logo, a job title or rank, or other summary information about the individual.

In some embodiments, the app shows one or more icons or badges 66a-66d on the display 62. That is, in addition to instantly recognizing the individual in the field of view of the camera, the system with which the smartphone 60 is communicating has indicated to the app that different types of additional information about the individual are present, and the app is showing corresponding icons 66a-66d on the display 62. For example, the badge 66a may represent that the pictured individual has won a company award, the badge 66b that the individual has filed or been awarded a patent for inventiveness, the badge 66c that the individual has won a contest (e.g. a programming competition), and the badge 66d that the individual has contributed to volunteer activities. It should be understood that the types and number of icons or badges displayed in FIG. 4, and the information that they represent, is merely illustrative, and that embodiments may display any number of graphical elements (including text links) for the same purpose without deviating from the teachings herein.

In some embodiments, the app also shows an additional text area 68 for displaying other textual information about the pictured individual. In FIG. 4, for example, the text area 68 provides a "fun fact" about the individual so that a user of the smartphone 60 in accordance with the embodiment has an "ice breaker" permitting the user to strike up a conversation, even if the user and the pictured individual have never met. Thus, embodiments facilitate social interaction using technological means.

It is appreciated that other arrangements of graphical elements can accomplish the same functions and results just described, and that FIG. 4 is merely illustrative. A person having ordinary skill in the art should understand how to create applications or apps on a variety of client devices that arrange functional elements of a graphical user interface (GUI) so as to accomplish these functions and results according to the teachings herein.

In accordance with various embodiments, and as described in more detail below in connection with FIGS. 5A to 5D, the display 62 may be a touch screen, and touching icons or badges 66a-66d may activate a function of the app to display more information about the pictured individual.

FIGS. 5A to 5D graphically represent a sequence of arrangements of visual elements during a user interaction with an instant recognition embodiment. These Figures illustrate a graphical user interface 70a-70d (collectively, the GUI 70) at different times during the user interaction. The GUI 70 shown in FIGS. 5A to 5D is that of a smartphone camera app, as modified by the teachings herein, but it is appreciated that the display may appear on any client device (such as client device 11) having a camera. In particular, the GUI 70 may appear on a camera 22, a smartphone 24, AR glasses 26, or other electronic device. It should be understood that the GUI 70 shows visual elements according to the design and operation of an application or app executing on the client device. The app may be provided with the electronic device by its manufacturer, or may be downloaded and installed onto the electronic device after acquisition. The instant recognition embodiment may be implemented, for example, by the system 20 of FIG. 2.

Figure 5A:
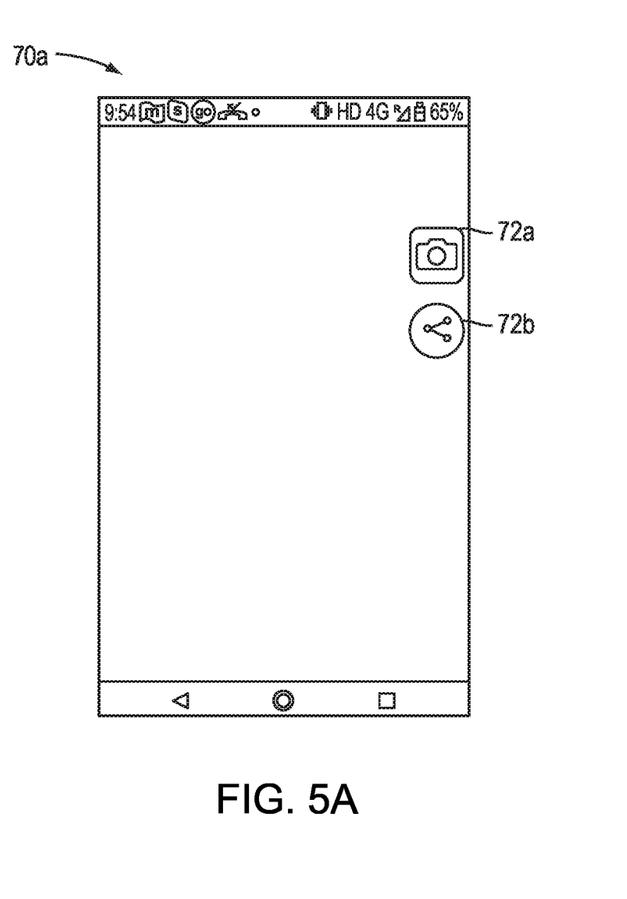
FIGS. 5A to 5D graphically represent a sequence of arrangements of visual elements during a user interaction with an instant recognition embodiment.

In FIG. 5A is shown a GUI 70a displaying a blank camera image, and in particular an image that does not include an individual. Notably, the GUI 70a includes two icons: a camera icon 72a and a sharing icon 72b. As is known in the art, the camera icon 72a may be used to capture an image, and the sharing icon 72b may be used to share a captured image with others.

Figure 5B:
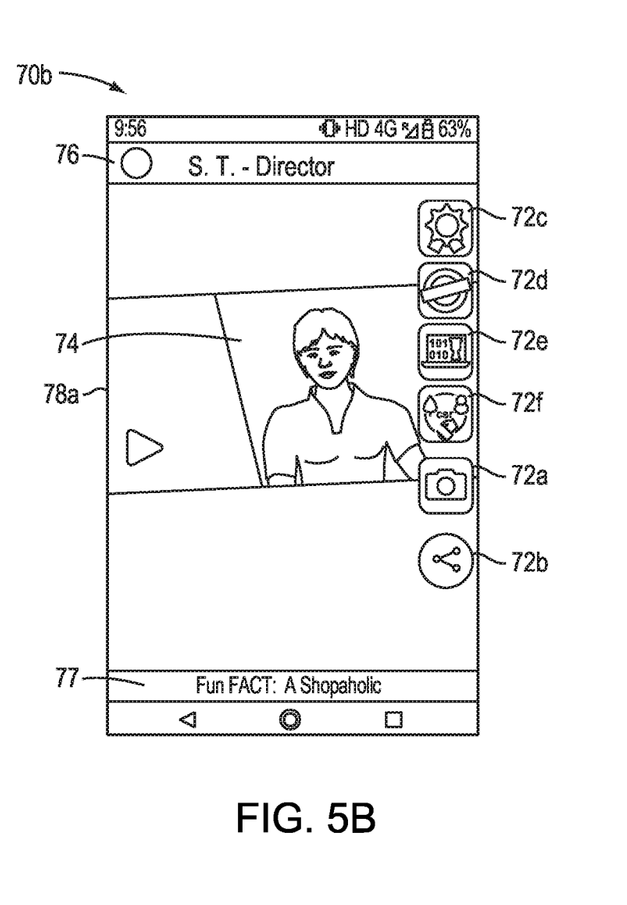

In FIG. 5B is shown a GUI 70b displaying a captured image of an individual 74, for example as might occur after a user touches the camera icon 72a. In accordance with disclosed embodiments, the individual has been instantly recognized using an instant recognition system. Thus, additional information about the individual has been provided to the app for display in the GUI 70b, including four additional icons or badges 72c, 72d, 72e, and 72f Also, the individual's name and job title are displayed in a name bar 76, and a "fun fact" is displayed in an additional text area 77. Thus, the GUI 70b displays an arrangement of visual elements similar that that of FIG. 4 but with respect to a different individual.

Additionally, however, the GUI 70b shows a video area 78a next to the individual 74. In embodiments in which the GUI 70 displays real-time camera data, the video area 78 will be rendered at a fixed distance from the image of the individual 74, regardless of the orientation of the camera. That is, so long as the camera field of view includes the individual 74, the video area 78a will appear along side the individual, thereby further improving the AR experience.

Figure 5C:
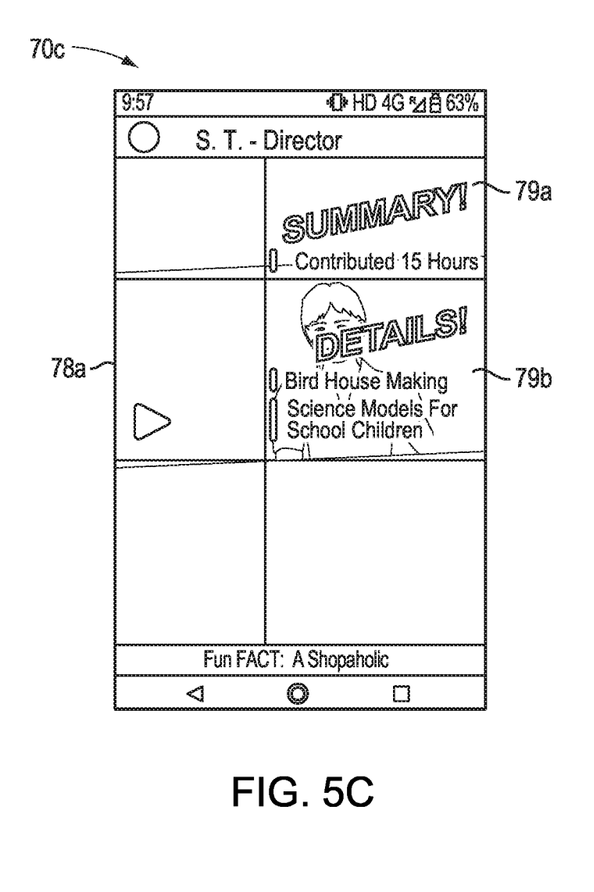

In FIG. 5C is shown a GUI 70c displaying further information about the individual 74, for example as might occur after a user touches the additional text area 79. It is appreciated that a user may touch any of the icons or badges 72a-72f, or the image of the individual 74, the video area 78a, or any other area of the touchscreen to activate functions of the app displaying the GUI 70. In illustrative FIG. 5C, one of those functions is to display a summary area 79a and a details area 79b on a side of the GUI 70c. These areas 79a and 79b may include any sort of information about the individual 74, especially information provided to the smartphone by the instant recognition system.

Figure 5D:
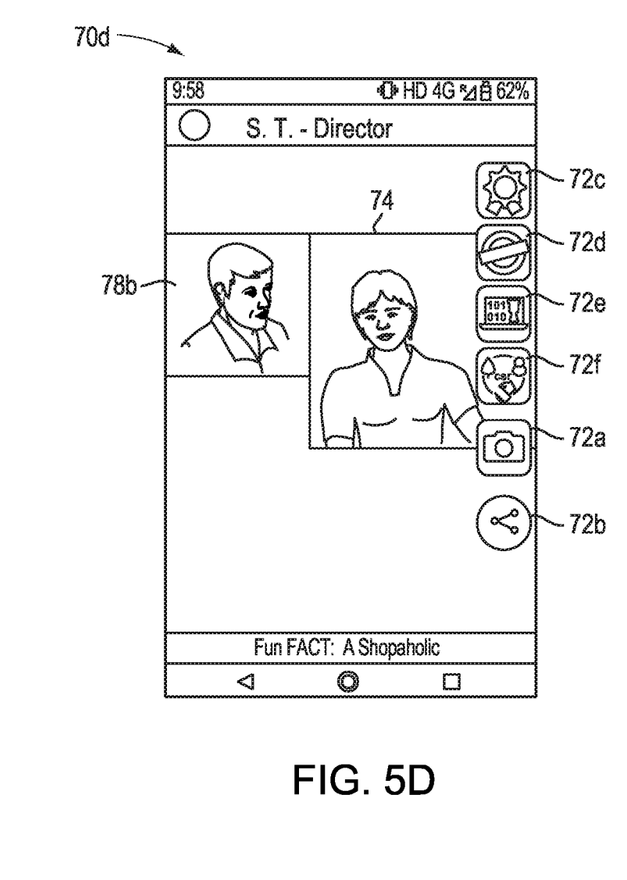

In FIG. 5D is shown a GUI 70d displaying a video 78b next to the individual 74, for example as might occur after a user touches the video area 78a of FIG. 5B. The content of the video 78b may be, for example, a person related to the individual 74 (e.g. a company leader or manager) who is speaking about the individual, especially offering praise for the individual. In accordance with illustrative embodiments, the video 78b is provided to the client device from the instant recognition system, for example by streaming the data to the client device for immediate display. In some embodiments, the instant recognition system generates the video 78b in real-time according to a script, as described above in connection with FIGS. 2 and 3. The instant recognition system may analyze image data from the client device and transform the image data of the video 78b to fit better into the imaged environment. Thus, for example, the instant recognition system may transform the video 78b so that the speaker in the video is facing the viewer, or facing the same direction as the imaged individual 74, or in some other direction.

FIGS. 6A to 6D graphically represent a sequence of arrangements of visual elements during a user interaction with an achievement canvas embodiment. These Figures illustrate a graphical user interface 80a-80d (collectively, the GUI 80) at different times during the user interaction. The GUI 70 shown in FIGS. 6A to 6D is that of a smartphone camera app, as modified by the teachings herein, but it is appreciated that the display may appear on any client device (such as client device 11) having a camera. In particular, the GUI 80 may appear on a camera 22, a smartphone 24, AR glasses 26, or other electronic device. It should be understood that the GUI 70 shows visual elements according to the design and operation of an application or app executing on the client device. The app may be provided with the electronic device by its manufacturer, or may be downloaded and installed onto the electronic device after acquisition. The achievement canvas embodiment may be implemented, for example, by the system 20 of FIG. 2.

Figure 6A:
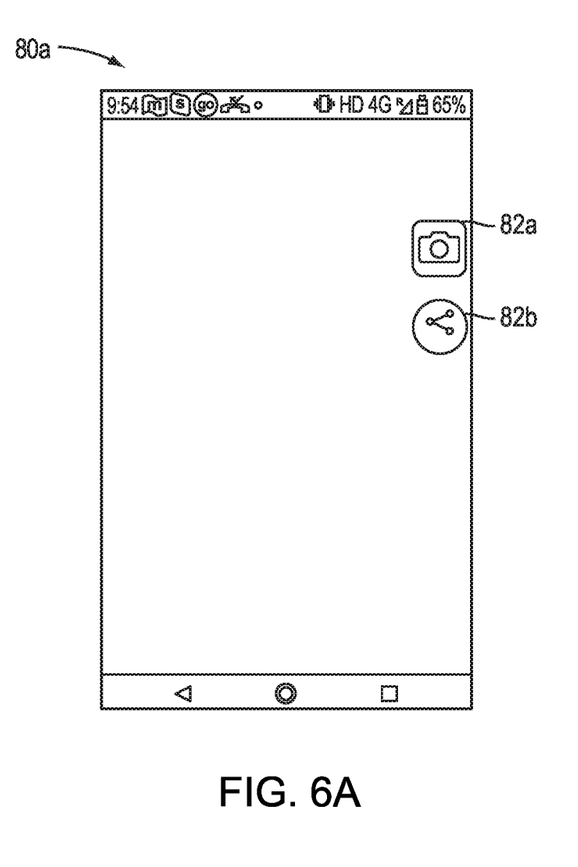
FIGS. 6A to 6D graphically represent a sequence of arrangements of visual elements during a user interaction with an achievement canvas embodiment.

In FIG. 6A is shown a GUI 80a showing a blank camera image, and in particular an image that does not include an individual. Notably, the GUI 80a includes two icons: a camera icon 82a and a sharing icon 82b.

Figure 6B:
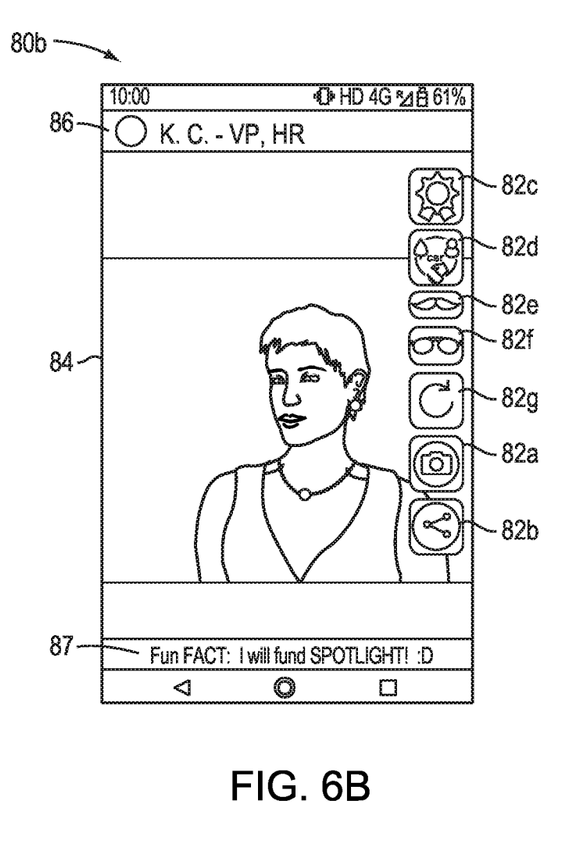

In FIG. 6B is shown a GUI 80b displaying a captured image of an individual 84, for example as might occur after a user touches the camera icon 82a. In accordance with disclosed embodiments, the individual has been instantly recognized using an instant recognition system. Thus, additional information about the individual has been provided to the app for display in the GUI 70b, including two additional badges 82c and 82d, and three additional image manipulation icons 82e, 82f, and 82g. Also, the individual's name and job title are displayed in a name bar 86, and a "fun fact" is displayed in an additional text area 87.

The GUI 80b may be used interactively to annotate the image of the user with various supplemental images, so that the annotation data may be transmitted to a client device for display over an identified individual in accordance with the embodiments described above. This is shown in the GUI 80c of FIG. 6C, in which the image of the individual 84 has been modified to include an award badge and sunglasses. Annotation can be carried out according to techniques known in the art. For example, to achieve the annotation shown in the GUI 80c, the user may have touched the award icon 82c and the sunglasses icon 82f. In response, the app may have placed an image of the award and an image of the sunglasses into the GUI 80c. In some embodiments, the user may have further dragged these items into position, for example by pressing and holding each image until it is "picked up", then sliding the pressing finger to the desired screen location.

Figure 6C:
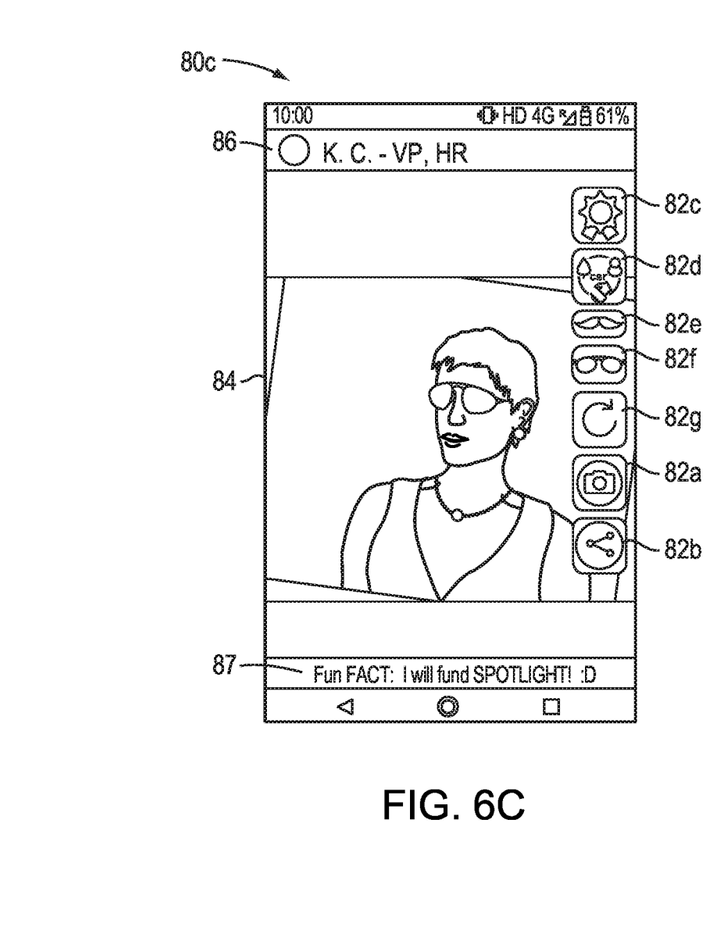
Figure 6D:
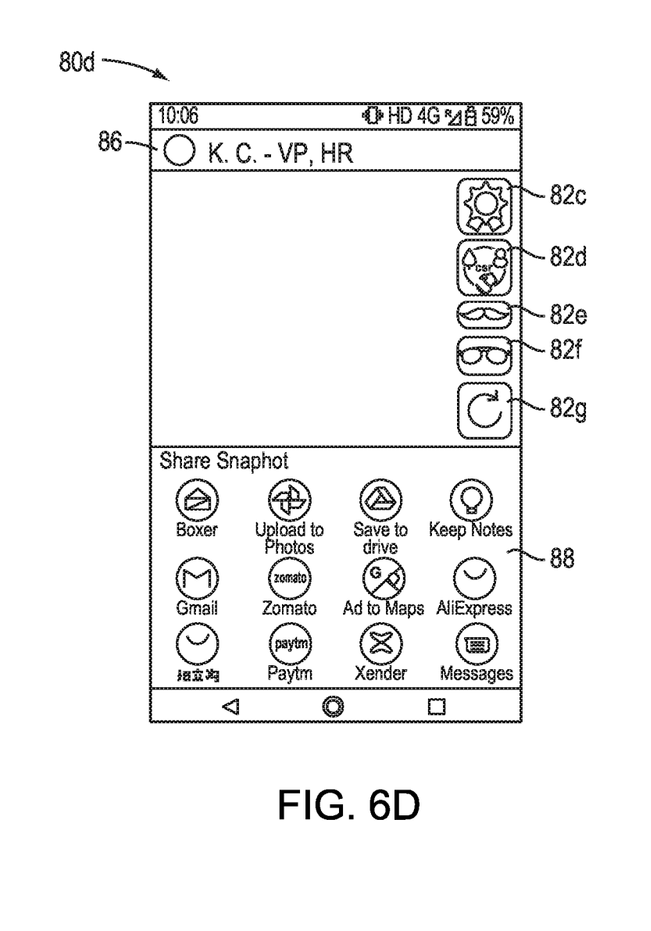

In FIG. 6D is shown a GUI 80d providing a sharing box 88 containing user selectable options to share the annotated or modified image shown in FIG. 6C, for example, as might occur after the user touches the sharing icon 82b. As is known in the art, smartphones often include the ability for apps to register themselves for sharing of certain types of data, such as images. In accordance with embodiments, the app providing the GUI 80 may include program code accessing the app registry to display the sharing box 88. If the user touches an icon in the sharing box 88, the appropriate app will be launched for sharing the modified image.

Figure 7:
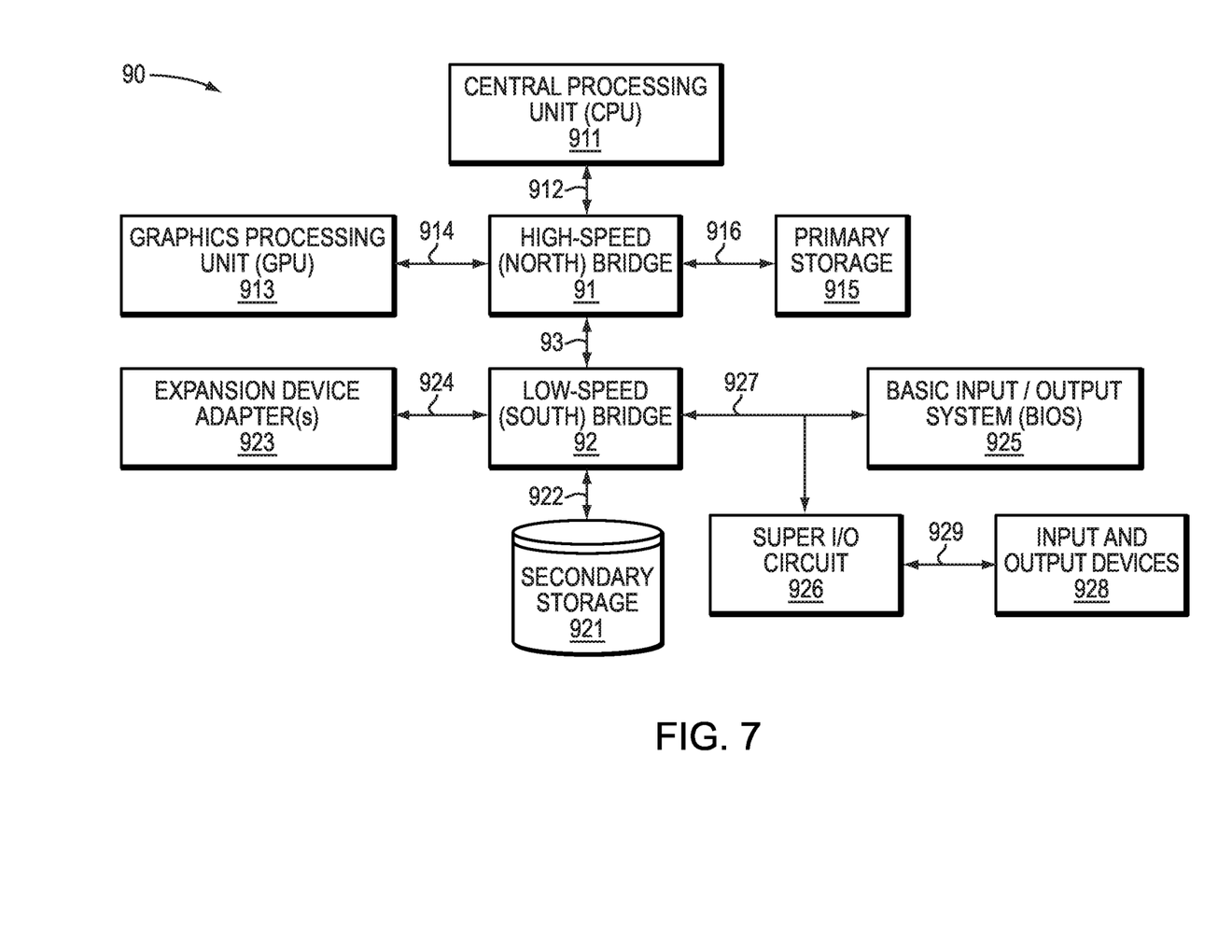
FIG. 7 schematically shows relevant physical components of a computer processing system embodiment.

In FIG. 7 is schematically shown relevant physical components of a computer processing system 90 embodiment of the concepts, structures, and techniques disclosed herein. In particular, the computer 90 may be used to implement any or all of the client device 11, the server device 15, the system 20, the method 50, the smartphone 60, or the app showing the GUIs 70 or 80. Generally, the computer 90 has many functional components that communicate data with each other using data buses. The functional components of FIG. 9 are physically arranged based on the speed at which each must operate, and the technology used to communicate data using buses at the necessary speeds to permit such operation.

Thus, the computer 90 is arranged as high-speed components and buses 911 to 916 and low-speed components and buses 921 to 929. The high-speed components and buses 911 to 916 are coupled for data communication using a high-speed bridge 91, also called a "northbridge," while the low-speed components and buses 921 to 929 are coupled using a low-speed bridge 92, also called a "southbridge."

The computer 90 includes a central processing unit ("CPU") 911 coupled to the high-speed bridge 91 via a bus 912. The CPU 911 is electronic circuitry that carries out the instructions of a computer program. As is known in the art, the CPU 911 may be implemented as a microprocessor; that is, as an integrated circuit ("IC"; also called a "chip" or "microchip"). In some embodiments, the CPU 911 may be implemented as a microcontroller for embedded applications, or according to other embodiments known in the art.

The bus 912 may be implemented using any technology known in the art for interconnection of CPUs (or more particularly, of microprocessors). For example, the bus 912 may be implemented using the HyperTransport architecture developed initially by AMD, the Intel QuickPath Interconnect ("QPI"), or a similar technology. In some embodiments, the functions of the high-speed bridge 91 may be implemented in whole or in part by the CPU 911, obviating the need for the bus 912.

The computer 90 includes one or more graphics processing units (GPUs) 913 coupled to the high-speed bridge 91 via a graphics bus 914. Each GPU 913 is designed to process commands from the CPU 911 into image data for display on a display screen (not shown). In some embodiments, the CPU 911 performs graphics processing directly, obviating the need for a separate GPU 913 and graphics bus 914. In other embodiments, a GPU 913 is physically embodied as an integrated circuit separate from the CPU 911 and may be physically detachable from the computer 90 if embodied on an expansion card, such as a video card. The GPU 913 may store image data (or other data, if the GPU 913 is used as an auxiliary computing processor) in a graphics buffer.

The graphics bus 914 may be implemented using any technology known in the art for data communication between a CPU and a GPU. For example, the graphics bus 914 may be implemented using the Peripheral Component Interconnect Express ("PCI Express" or "PCIe") standard, or a similar technology.

The computer 90 includes a primary storage 915 coupled to the high-speed bridge 91 via a memory bus 916. The primary storage 915, which may be called "main memory" or simply "memory" herein, includes computer program instructions, data, or both, for use by the CPU 911. The primary storage 915 may include random-access memory ("RAM"). RAM is "volatile" if its data are lost when power is removed, and "non-volatile" if its data are retained without applied power. Typically, volatile RAM is used when the computer 90 is "awake" and executing a program, and when the computer 90 is temporarily "asleep", while non-volatile RAM ("NVRAM") is used when the computer 90 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 916 may be implemented using any technology known in the art for data communication between a CPU and a primary storage. The memory bus 916 may comprise an address bus for electrically indicating a storage address, and a data bus for transmitting program instructions and data to, and receiving them from, the primary storage 915. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 90 may use up to $8*2^{32}=32$ gigabytes (GB) of primary storage 915. In this example, the memory bus 916 will have a total width of 64+32=96 bits. The computer 90 also may include a memory controller circuit (not shown) that converts electrical signals received from the memory bus 916 to electrical signals expected by physical pins in the primary storage 915, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 911, the graphics processing units 913, the primary storage 915, and the high-speed bridge 91, or any combination thereof, as a single integrated circuit. In such embodiments, buses 912, 914, 916 may form part of the same integrated circuit and need not be physically separate. Other designs for the computer 90 may embody the functions of the CPU 911, graphics processing units 913, and the primary storage 915 in different configurations, obviating the need for one or more of the buses 912, 914, 916.

The depiction of the high-speed bridge 91 coupled to the CPU 911, GPU 913, and primary storage 915 is merely exemplary, as other components may be coupled for communication with the high-speed bridge 91. For example, a network interface controller ("NIC" or "network adapter") may be coupled to the high-speed bridge 91, for transmitting and receiving data using a data channel. The NIC may store data to be transmitted to, and received from, the data channel in a network data buffer.

The high-speed bridge 91 is coupled for data communication with the low-speed bridge 92 using an internal data bus 93. Control circuitry (not shown) may be required for transmitting and receiving data at different speeds. The internal data bus 93 may be implemented using the Intel Direct Media Interface ("DMI") or a similar technology.

The computer 90 includes a secondary storage 921 coupled to the low-speed bridge 92 via a storage bus 922. The secondary storage 921, which may be called "auxiliary memory", "auxiliary storage", or "external memory" herein, stores program instructions and data for access at relatively low speeds and over relatively long durations. Since such durations may include removal of power from the computer 90, the secondary storage 921 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 922 may be implemented using any technology known in the art for data communication between a CPU and a secondary storage and may include a host adaptor (not shown) for adapting electrical signals from the low-speed bridge 92 to a format expected by physical pins on the secondary storage 921, and vice versa. For example, the storage bus 922 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 90 also includes one or more expansion device adapters 923 coupled to the low-speed bridge 92 via a respective one or more expansion buses 924. Each expansion device adapter 923 permits the computer 90 to communicate with expansion devices (not shown) that provide additional functionality. Such additional functionality may be provided on a separate, removable expansion card, for example an additional graphics card, network card, host adaptor, or specialized processing card.

Each expansion bus 924 may be implemented using any technology known in the art for data communication between a CPU and an expansion device adapter. For example, the expansion bus 924 may transmit and receive electrical signals using a Peripheral Component Interconnect ("PCI") standard, a data networking standard such as an Ethernet standard, or a similar technology.

The computer 90 includes a basic input/output system (BIOS) 925 and a Super I/O circuit 926 coupled to the low-speed bridge 92 via a bus 927. The BIOS 925 is a non-volatile memory used to initialize the hardware of the computer 90 during the power-on process. The Super I/O circuit 926 is an integrated circuit that combines input and output ("I/O") interfaces for low-speed input and output devices 928, such as a serial mouse and a keyboard. In some embodiments, BIOS functionality is incorporated in the Super I/O circuit 926 directly, obviating the need for a separate BIOS 925.

The bus 927 may be implemented using any technology known in the art for data communication between a CPU, a BIOS (if present), and a Super I/O circuit. For example, the bus 927 may be implemented using a Low Pin Count ("LPC") bus, an Industry Standard Architecture ("ISA") bus, or similar technology. The Super I/O circuit 926 is coupled to the I/O devices 928 via one or more buses 929. The buses 929 may be serial buses, parallel buses, other buses known in the art, or a combination of these, depending on the type of I/O devices 928 coupled to the computer 90.

The techniques and structures described herein may be implemented in any of a variety of different forms. For example, features may be embodied within various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features are grouped together in one or more individual embodiments for the purpose of streamlining the disclosure. This method of disclosure is not to be interpreted as reflecting an intention that the claims require more features than are expressly recited. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A system for providing an interactive augmented reality experience using an electronic device having a camera and a display, the system comprising:
    a data communication gateway configured to receive data, from the camera, that encodes an image being shown on the display, the image including a first individual's face;
    a face recognizer in data communication with the gateway and configured to automatically identify the first individual using the data received by the gateway;
    a data aggregator in data communication with the face recognizer and configured to retrieve, from one or more information sources, textual, graphical, audible, or audiovisual information pertaining to the identified first individual;
    a video creator in data communication with the face recognizer and configured to automatically generate a video of a second individual speaking about the identified first individual; and
    a database coupled to the video creator, wherein the video creator is configured to automatically generate the video of the second individual speaking about the identified first individual comprising training a generative adversarial network on stock footage of the second individual that is stored in the database;
    wherein the data communication gateway is further configured to transmit the textual, graphical, audible, or audiovisual information, or the video, or any combination thereof toward the electronic device for presentation on the display overlying the image being shown on the display.

2. The system according to claim 1, further comprising a database coupled to the face recognizer, wherein the face recognizer is configured to automatically identify the first individual from within a plurality of individuals, using facial features extracted from each of the plurality of individuals and stored in the database.

3. The system according to claim 1, further comprising a database coupled to the data aggregator, wherein the data aggregator is configured to regularly retrieve, and store in the database, the textual, graphical, audible, or audiovisual information.

4. A method of providing an interactive augmented reality experience using an electronic device having a camera and a display, the method comprising:
    receiving data, in a computer system from the camera, that encodes an image being shown on the display, the image including a first individual's face;
    automatically identifying the first individual using the received data;
    retrieving, from one or more information sources, textual, graphical, audible, or audiovisual information pertaining to the identified first individual;
    automatically generating a video of a second individual speaking about the identified first individual comprising training a generative adversarial network on stock footage of the second individual that is stored in a database; and
    transmitting the textual, graphical, audible, or audiovisual information, or the video, or any combination thereof by the computer system toward the electronic device for presentation on the display overlying the image being shown on the display.

5. The method according to claim 4, wherein the camera has wireless data communication, or the electronic device comprises either a smartphone or augmented reality glasses.

6. The method according to claim 4, wherein the image being shown on the display comprises the video.

7. The method according to claim 4, wherein automatically identifying the first individual using the received data comprises using facial features extracted from each of a plurality of individuals and stored in a database.

8. The method according to claim 4, wherein retrieving the textual, graphical, audible, or audiovisual information comprises regularly retrieving, and storing in a database, the textual, graphical, audible, or audiovisual information.

9. The method according to claim 4, wherein retrieving the textual, graphical, audible, or audiovisual information comprises retrieving information that was associated to the identified first individual by the first individual using an image editing application.

10. The method according to claim 4, wherein transmitting comprises transmitting in response to receiving data, from the electronic device, indicating that a third individual who is a user of the electronic device has selected a control in a graphical user interface overlying the image shown on the display.

11. A non-transitory tangible, computer-readable storage medium, in which is stored computer program code for performing a method of providing an interactive augmented reality experience using an electronic device having a camera and a display, the method comprising:
    receiving data, in a computer system from the camera, that encodes an image being shown on the display, the image including a first individual's face;
    automatically identifying the first individual using the received data;
    retrieving, from one or more information sources, textual, graphical, audible, or audiovisual information pertaining to the identified first individual;

automatically generating a video of a second individual speaking about the identified first individual comprising training a generative adversarial network on stock footage of the second individual that is stored in a database; and transmitting the textual, graphical, audible, or audiovisual information, or the video, or any combination thereof by the computer system toward the electronic device for presentation on the display overlying the image being shown on the display.

12. The storage medium according to claim 11, wherein the camera has wireless data communication or the electronic device comprises either a smartphone or augmented reality glasses.

13. The storage medium according to claim 11, wherein the image being shown on the display comprises the video.

14. The storage medium according to claim 11, wherein automatically identifying the first individual using the received data comprises using facial features extracted from each of a plurality of individuals and stored in a database.

15. The storage medium according to claim 11, wherein retrieving the textual, graphical, audible, or audiovisual information comprises regularly retrieving, and storing in a database, the textual, graphical, audible, or audiovisual information.

16. The storage medium according to claim 11, wherein retrieving the textual, graphical, audible, or audiovisual information comprises retrieving information that was associated to the identified first individual by the first individual using an image editing application.

17. The storage medium according to claim 11, wherein transmitting comprises transmitting in response to receiving data, from the electronic device, indicating that a third individual who is a user of the electronic device has selected a control in a graphical user interface overlying the image shown on the display.

* * * * *